April 20, 1954     H. E. MALONE     2,676,221

SWITCHING APPARATUS

Filed Dec. 14, 1948     3 Sheets-Sheet 1

INVENTOR.
Homer E. Malone
BY
Tate Wheeler & Weikart

April 20, 1954     H. E. MALONE     2,676,221
SWITCHING APPARATUS

Filed Dec. 14, 1948     3 Sheets-Sheet 2

INVENTOR.
Homer E. Malone
BY
Tate Wheeler & Weikart

April 20, 1954  H. E. MALONE  2,676,221
SWITCHING APPARATUS
Filed Dec. 14, 1948  3 Sheets-Sheet 3

INVENTOR.
Homer E. Malone
BY
Tate Wheeler & Weikart

Patented Apr. 20, 1954

2,676,221

UNITED STATES PATENT OFFICE 2,676,221

SWITCHING APPARATUS

Homer E. Malone, Milwaukee, Wis., assignor to Perfex Corporation, Milwaukee, Wis., a corporation of Wisconsin Application December 14, 1948, Serial No. 65,233

2 Claims. (Cl. 200—67)

This invention relates generally to switching apparatus and more particularly to thermostatic switching apparatus for the control of the application of heat to domestic hot water storage tanks.

The principal object of this invention is to provide a switching apparatus which is well adapted to mass production by virtue of calibrating adjustments which can easily and conveniently be made giving uniform accuracy in response of the apparatus although the dimensions of the parts making up the apparatus are held within relatively wide tolerances.

A further object is to provide a switching apparatus having a pivotally mounted, movable contact-carrying member movable between two positions, the position of the pivotal mounting being adjustable to vary the distance through which the contact-carrying member must be moved in travelling from one to the other of its alternate positions.

Other objects and attendant advantages will be appreciated by those skilled in this art as the invention becomes better understood by reference to the following description when considered in connection with the accompanying drawings in which.

Figure 1:
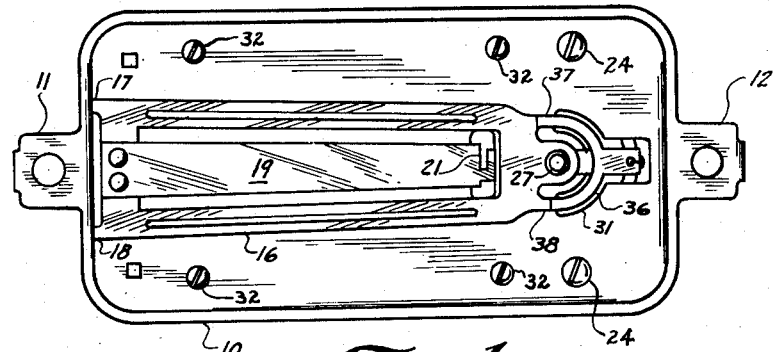
Fig. 1 represents a rear view of a portion of the thermostatic switching apparatus including the temperature responsive element and the casing.
Figure 2:
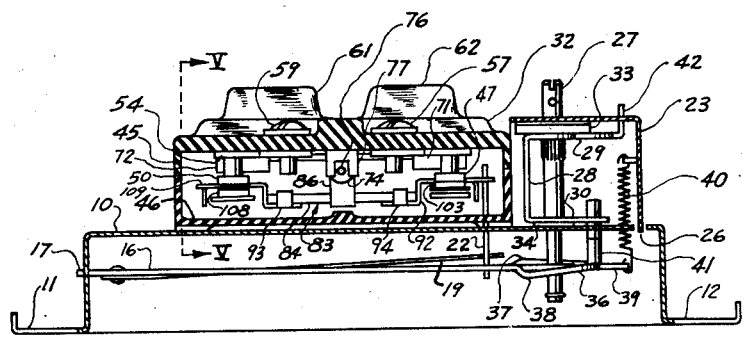
Fig. 2 represents a sectional view of the thermostatic switching mechanism taken generally along the line II—II of Fig. 3.
Figure 3:
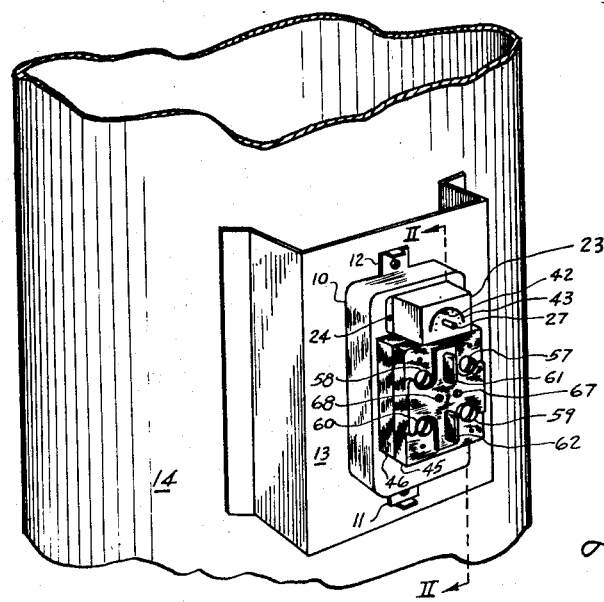
Fig. 3 is a perspective view of the switching apparatus installed on a hot water storage tank.

Figs. 1, 2, and 3 illustrate an actuating means for the switching apparatus which in the form illustrated includes thermally responsive means responding to the surface temperature of a hot water storage tank. This actuating means is described in detail and claimed in my Patent Number 2,597,651, issued May 20, 1952.

Referring to Figures 1, 2 and 3, there is shown rectangular casing 10 having extending portions 11 and 12 which are utilized in mounting the casing 10 on a suitable mounting bracket 13 (Figure 3). Bracket 13 is secured by any suitable means, such as welding to a hot water storage tank 14.

Pivotally mounted within casing 10 is a support member 16, the pivotal mounting being accomplished by means of the tabs 17 and 18 extending loosely through rectangular openings in the side of casing 10. A thermal responsive switch actuator 19, consisting of a bimetal strip is secured by any suitable means such as rivets, to the end of member 16 adjacent the pivotal mounting tabs 17 and 18. Strip 19 has its free end notched, as at 21, for engagement with a connecting means or link 22 formed of insulating material, which transmits motion of strip 19 to the switching mechanism as will presently be explained.

A three sided housing 23 is mounted atop the casing 10 and secured thereto by any suitable means such as screws 24 (Figure 3) and downwardly extending tab 26 (Figure 2). An adjusting post 27 extends through an opening in the top of housing 23 and through an opening in casing 10. Post 27 is held against longitudinal displacement by means of a bracket 28, channel shaped in cross-section, having a first arm or flange 29 and a second arm or flange 30, arms 29 and 30 each having openings therein through which post 27 extends. Splines on post 27 are forced into the opening in arm 29, thus rigidly securing post 27 to bracket 28. It will be noted that the central web portion of bracket 28 does not extend to the top of the housing 23 (Figure 2), thus serving to permit insertion of a spring washer 33 between the top of housing 23 and the arm 29 which resiliently urges post 27 to its extreme downward position as determined by arm 30 of bracket 28. Bracket 28 bears against an anti-friction washer 34, inserted between arm 30 and casing 10.

Post 27 extends freely through an opening in member 16, thereby serving as a lateral support but permitting limited longitudinal movement of the free end of member 16. The free end of member 16 is formed so as to provide an arcuate cam track 36 having a high point 37 and a low point 38. A tension spring 40 is secured between a point of attachment on the side wall of housing 23 and an extension 39 of the member 16. Casing 10 has a cut out portion 31 adjacent the cam track 36 and extension 39, as may best be seen in Figure 1, permitting spring 40 and adjacent parts to extend freely between the interior of housing and the interior of casing 10. The purpose of spring 40 is to bias member 16 upwardly against a cam follower 41 which is threaded through an opening in arm 30 and extends downwardly to abut cam track 36. The arm 29 has an upturned portion 42 which extends through an arcuate slot 43 (Figure 3) in the top of housing 23 and in conjunction with suitable scale markings which may be inscribed adjacent slot 43 serves to indicate the rotational position of post 27, and consequently cam follower 41, with reference to cam track 36.

From Figure 2 it will thus be seen that counter-clockwise rotation of post 27 will move cam follower 41 to the high point on cam track 36. Since post 27 cannot move longitudinally, member 16 and consequently bimetal 19 will be moved to its lowermost reference position. Conversely, clockwise rotation of post 27 places cam follower 41 in the low point on cam track 36 and establishes the high reference position for bimetal 19. Adjustment of post 27 thus fixes the control point of the apparatus by establishing the reference position of strip 19 from which temperature change may cause further movement of strip 19 in either direction depending on the direction of the temperature change.

Figure 4:
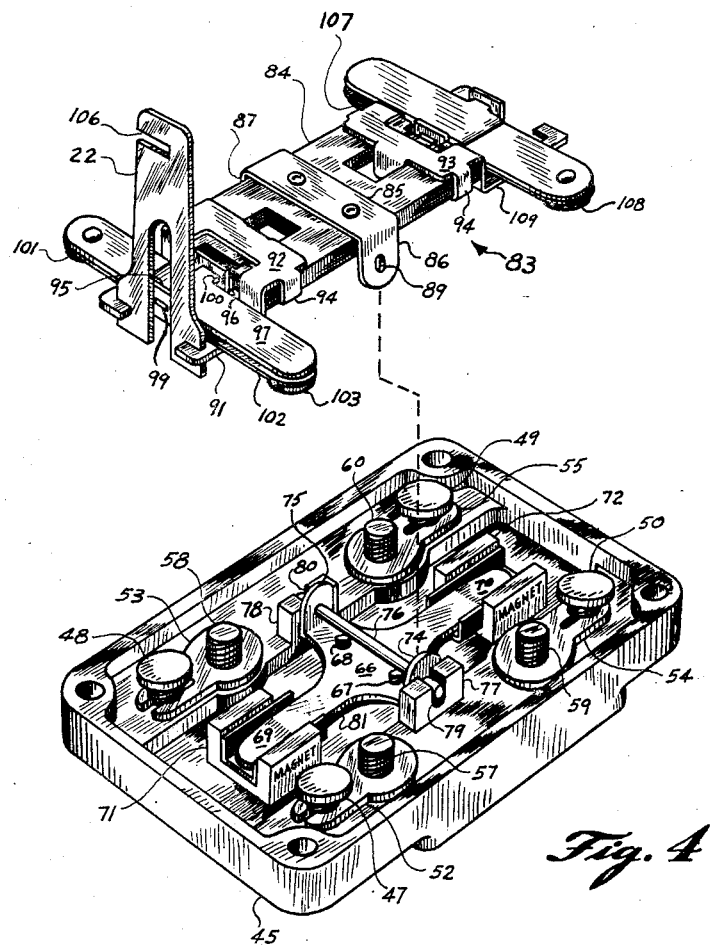
Fig. 4 represents a perspective, exploded view of the switch structure as distinguished from the temperature responsive portion of the apparatus.
Figure 5:
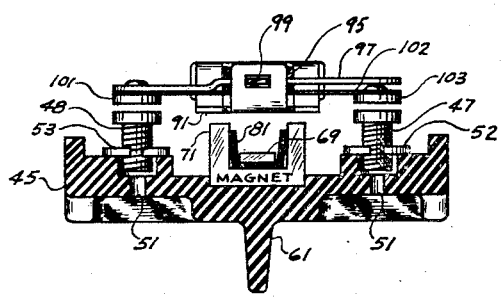
Fig. 5 represents a section taken generally along the line V—V of Fig. 2.

Referring now to Figures 2, 4, and 5, it will be seen that the switching apparatus, operated by bimetal 19 in response to temperature change, is enclosed in a box-like case formed of Bakelite or other similar insulating material and has an upper half comprising switch plate or base 45 (shown inverted in Fig. 4) and a lower half comprising switch plate 46. This Bakelite switch casing is mounted adjacent the housing 23 and is secured in place by means of screws 32 (Figure 1) which extend through casing 10, through switch plate 46 and are threaded into tapped holes (not shown) in the switch plate 45.

Upon reference to Figure 4, it will be noted that the stationary parts of the switching apparatus are mounted on the switch plate, or base, 45. This switching apparatus, as illustrated in Figure 4, is of the double throw type and contact members 47, 48, 49, and 50, each of which has a threaded shank shaped to receive a tool insertable through an opening 51 (Figure 5) in the plate 45. Each contact member shank is adjustable by such a tool in one of the lugs 52, 53, 55, and 54, respectively. These lugs provide an electrical connection between the contacts 47, 48, 49, and 50 and the terminal screws 57, 58, 60, and 59 respectively. Lugs 52, 53, 54 and 55 are secured to plate or base 45 by any suitable means such as tubular rivets the central bore of which is threaded to receive the terminal screws 57, 58, 59, and 60. These terminal screws are readily accessible from outside the Bakelite casing and have interposed between them barriers 61 and 62 formed integrally with switch plate 45 as may best be seen in Figure 3.

A cradle or hinge mounting member 66 is adjustably secured to the plate or base 45 by means of screws 67 and 68 whose heads are accessible from outside the casing, as may best be seen in Figure 3.

Member 66 has two extending portions or arms 69 and 70 which are arched downwardly, as viewed in Figure 4, and extend between the poles of identical magnets 71 and 72 respectively thereby serving to hold the magnets adjacent the fixed contacts. Member 66 has two upturned ears 74 and 75 which carry a pin 76 rigidly attached thereto. Bosses 77 and 78 extend upwardly from plate 45 and are slotted at 79 and 80 to receive pin 76. A fiber member 81, having the same general configuration as member 66 underlies member 66 and extends between portions 69 and 70 and magnets 71 and 72 respectively. From the above description it will be apparent that the pin 76 may be raised or lowered within the slots 79 and 80 by adjusting screws 67 and 68. Although pin 76 can be adjusted to the uppermost portions of slots 79 and 80, magnets 71 and 72 will be securely held on plate 45 since portions 69 and 70 are somewhat resilient and are bent downwardly as previously pointed out.

Pivotally mounted on the pin 76 is a contact carrying lever or rocker member designated generally by numeral 83. Lever 83 is shown in detail in the exploded view, Figure 4, and its operative, mounted position is shown in Figure 2. Contact carrying lever 83 comprises a central fiber member 84 having riveted thereto a member 85 which has as viewed in Figure 4 two downwardly extending hinge pintle receiving ears 86 and 87. With lever 83 in mounted position the ears 86 and 87 are adjacent the inner faces of the ears 74 and 75 respectively, as may be seen in Figure 2, and pin 76 extends loosely through holes 89 in ears 86 and 87 thereby forming a central, pivotal mounting for the lever 83. Attached to each end of member 84 are offset brackets 92 and 93 having extending tabs 94 which firmly grip member 84.

The offset portion 91 of bracket 92 has two upstanding tabs 95 and 96. A contact bar 97 has two projections 99 and 100 which extend loosely through rectangular openings in the tabs 95 and 96 respectively, permitting limited rotational movement of bar 97 relative to bracket 92. Bar 97 has a movable contact 101 and a thin resilient strip 102 riveted to one of its ends, the strip 102 having the same general configuration as bar 97 as may best be seen in Figure 5. A second movable contact 103 is mounted on the free end of strip 102. The contacts 101 and 103, bar 97, and strip 102 form a bridging contact structure adapted to bridge the electrical gap between fixed contacts 47 and 48 when they are engaged by movable contacts 101 and 103 respectively, as may best be seen in Figure 5. The offset portion 91 serves as an armature for the magnet 71 thus serving to provide for snap opening and closing of the contacts in a manner well known in the art. The extreme end of bracket 92 is notched to receive an appropriately notched connecting means or insulating link 22 having a notched end 106 which, with the mechanism in assembled position, is attached to the notched end of strip 19, as may best be seen in Figure 2. The other end of the member 84 has secured thereto a bracket and contact mechanism including movable contacts 107 and 108 which cooperate with fixed contact 49 and 50 respectively, and armature 109 which cooperates with magnet 72. This contact structure is in all respects identical with that previously described.

From the above it will be apparent that lever 83 and its associated contacts form the movable portion of a double throw, bridging contact structure, and that, as viewed in Figure 4, a downward movement of link 22 will pivot lever 83 about pin 76 in a direction to bridge the electrical gap between contacts 47 and 48 with a snap motion and will open the electrical gap between contacts 49 and 50. An upward movement of link 22 will, conversely, open the contacts 47 and 48 and close the electrical gap between contacts 49 and 50.

In operation, referring to Figures 2 and 3, the assembled mechanism may be mounted on a hot water storage tank 14 by means of bracket 13. Bracket 13 has a cut out portion of the same general configuration as the open face of casing 10 so that the bimetal strip 19 is exposed to heat radiating from the tank 14. As shown in Figure 2, the post 27 is set in some intermediate position, for example, a position corresponding to a control point of 150° F. Strip 19 is in its cold position indicating the water in tank 14 is at a temperature lower than the control point setting of 150° F. Under these conditions the contacts 101—48 and 103—47 connected to terminal screws 57 and 58 are closed and the contacts 107—49 and 108—50 connected to terminals 59 and 60 are open. These terminals may be connected to suitable apparatus (not shown) for changing the temperature of the contents of tank 14. Should the temperature of the contents of tank 14 increase to a value greater than 150° F., the control point setting, the additional heat radiated from the sidewall of tank 14 to the bimetal strip 19 will cause it to move downwardly (as viewed in Figure 2) to open contacts 101—48 and 103—47 and close contacts 107—49 and 108—50.

One of the more important steps in the mass production of thermostatic switching apparatus, especially of the magnetic snap action type, is the calibration of the apparatus after assembly, so that small variations in the dimensions of the component parts will not cause unbalance or variation in the work required to actuate the switching mechanism from one to the other of its alternative positions. The work required to actuate the switching mechanism is equal to the product of the average force applied to actuate the switching mechanism and the total travel or movement necessary to accomplish such actuation. In order to function properly and uniformly when assembled in cooperative relation with its corresponding condition responsive element, each of the switching mechanisms produced must require the same, predetermined amount of work for actuation. In each switching mechanism, therefore, the actuating force and the switch travel must be held to the predetermined values.

Figure 6:
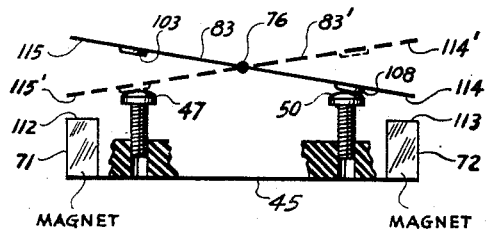
Fig. 6 represents a schematic showing of the adjustable relationship of portions of the switch structure shown in Fig. 4.

Referring now to Figure 6, which schematically shows lever 83, magnets 71 and 72, and associated contacts it will be noted that with lever 83 in its solid line position, the force required to actuate lever 83 to its broken line position 83' is determined principally by the closed contact armature gap between the pole face 113 and the armature 114. This gap may be adjusted by means of contact screw 50 so that the actuating force required to move the lever 83 from its solid line position to its broken line position 83' is the required, predetermined force. Likewise, the actuating force required to move lever 83 from its broken line position 83' to its solid line position may be made to equal the predetermined amount by adjustment of contact screw 47 which adjusts the gap between pole face 112 and armature 115'. Since the two magnets are of equal magnetic strength, the two closed contact armature gaps, i. e. the gap between pole face 113 and armature 114 and the gap between pole face 112 and armature 115', will be equal. Thus one component of the work required to actuate the switch, the actuating force, may be adjusted to the required, predetermined value. The other component, the switch travel (which can be defined as the vertical distance between the armature in its solid line position 114 and its broken line position 114') is dependent on the height of pin 76 above the base 45, and (since the closed contact armature gaps are fixed by the value of the predetermined, actuating force) upon the height of magnets 71 and 72. As long as the dimensions measuring the vertical distance between pin 76 and base 45 and the height of magnets 71 and 72 are held within close tolerances, each switching mechanism produced will have the required, predetermined switch travel, i. e., the distance between the solid line position and broken line position (114') of armature 114 will be the same for each switch produced and will equal the predetermined value.

Figure 7:
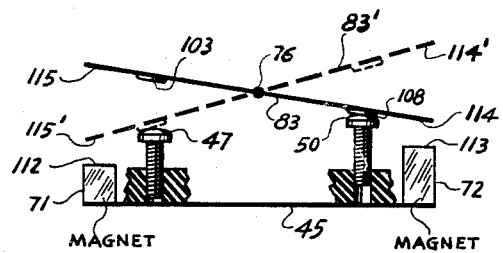
Fig. 7 is similar to Fig. 6 but illustrates the effect on the switch travel when certain parts of the structure are of incorrect dimensions.

If, however, the above mentioned dimensions are not held within close tolerances, for example, if one of the magnets (71) is slightly shorter than magnet 72, as illustrated in Figure 7, the switch travel will deviate from the predetermined value and, in the example illustrated in Figure 7 will be greater than the predetermined, optimum switch travel shown in Figure 6. This will be apparent since, if magnet 71 has a pole face 112 which is below pole face 113 of the magnet 72 contact screw 47 must be adjusted to a lower position in order to establish the required closed contact armature gap between pole face 112 and the armature's broken line position 115'. Since this contact screw 47 acts as a stop for lever 83 in its broken line position 83' and since, of necessity, its position is lower than its position in Figure 6, the switch travel (the vertical distance between the solid line position of armature 114 and its broken line position 114') will thus be greater in the illustration of Figure 7 than in the illustration of Figure 6 where both magnets are of the proper dimensions.

Figure 8:
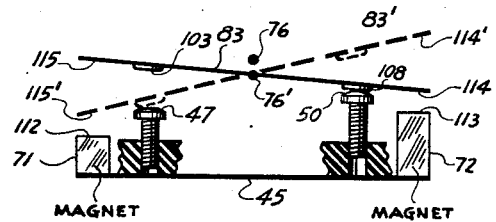
Fig. 8 is similar to Fig. 7 but illustrates the utility of one feature of the present invention.

Figure 8 is similar to Figure 7 in that one of the magnets (71) is shorter than magnet 72, but embodies a feature of the present invention in that the vertical position of pin 76 may be adjusted to position 76' (by means of adjustment screws 67 and 68, Figure 4, as previously pointed out) to compensate for the variation in the dimension of magnet 71 and establish the proper, predetermined switch travel even though the magnets are not of the proper dimension. This will be apparent from a comparison of Figures 6, 7 and 8. In Figure 7, after the required closed contact armature gaps are established by adjustment of contact screws 47 and 50, the switch travel is greater than the predetermined amount illustrated in Figure 6. However, if, as illustrated in Figure 8, the position of pin 76 is adjusted to position 76', the switch travel will thereby be made to equal the required, predetermined amount illustrated in Figure 6 wherein the magnets 71 and 72 are of uniform, correct dimension. It will be readily apparent that by adjusting pin 76 upwardly or downwardly compensation may be made (and the switch travel thus be made uniform) for any variation in the vertical dimension of magnets 71 and 72 or the thickness of base 45, for example where both magnets are oversize in vertical dimension, or both magnets undersize in vertical dimension.

The advantages thus gained in the mass production of switching mechanisms are obvious.

Figure 9:
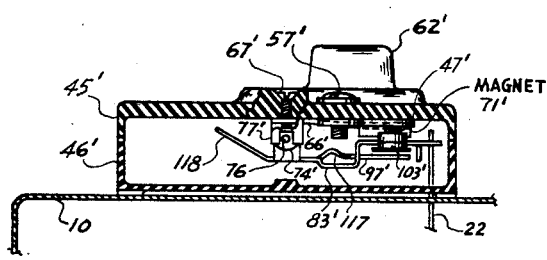
Fig. 9 is a sectional view, similar to Fig. 2 showing the single pole modification of the switch structure.

Figure 9 shows the switching mechanism previously described but modified into single pole form. This single pole modification differs from the double pole type in that one of the bridging contact assemblies and its associated fixed contacts and magnet are omitted. Cradle member 66' is similar to cradle member 66 (Fig. 4) but has only one extending portion serving to hold the single magnet 71' in place. Contact carrying lever 83' differs from lever 83 (Fig. 2) in that it is formed from a single metal stamping and has a central tongue 117 struck therefrom which acts as a stop for lateral movement of the contact bar 97'. The lever 83' also has a tongue 118 which is bent so as to engage the inner face of switch plate 45' when the contacts 47'—103 and adjacent identical contacts (not shown) are open, and to be spaced a short distance from plate 45' when the contacts 47'—103' are closed, as shown in Figure 9. The closed contact armature gap and thus the force required to actuate the switch from its closed contacts position to its open contacts position may be adjusted by means of adjustable contact screw 47' and the adjacent identical contact screw (not shown). If magnet 71' is not of proper height, and the travel of the switching mechanism is therefore not the desired amount, the switch travel may be adjusted to the desired, predetermined value by means of calibrating screw 67' and its adjacent, identical calibrating screw (not shown). Since the single throw switching mechanism shown in Fig. 9 has therein only one magnet and armature, it will be evident that, if the size of the magnet or associated parts varies only slightly, the switching mechanism may also be calibrated by merely drawing magnet 71' down tight against the wall 45', by means of screw 67' and its adjacent identical adjusting screw, and then adjusting the force necessary to open the contacts by adjusting the height of the fixed contact 47' and its adjacent identical fixed contact, as previously described.

Various modifications coming within the spirit of the invention may suggest themselves to those skilled in the art and hence the invention is not to be limited to the specific form shown, except to the extent indicated in the appended claims.

What is claimed is:

1. In a switching mechanism of the double throw type, a base, a cradle member supported on one side of said base and movable vertically relative thereto, a contact carrying lever pivotally mounted intermediate its ends on said cradle, a plurality of movable contacts supported on each end of said lever, a plurality of fixed contacts adjustably extending from said one side of said base opposite each of said movable contacts for engagement therewith, said movable contacts at one end of said lever and their adjacent fixed contacts forming a first set of contacts, said movable contacts at the other end of said lever and their adjacent fixed contacts forming a second set of contacts, magnetic means mounted on said one side of said base and resiliently held in mounted position by said cradle, armature means secured to said lever for coaction with said magnetic means, actuating means for pivotally moving said lever relative to said base between a first position at which said first set of contacts are in engagement and said second set of contacts are disengaged and a second position at which said second set of contacts are in engagement and said first set of contacts are disengaged, and adjusting means including an adjusting screw accessible from the other side of the base for vertically moving said cradle relative to said base to vary the distance said lever must be pivotally moved to travel between said first position and said second position.

2. In a switching mechanism of the double throw type, a base, a cradle member supported on one side of said base and movable vertically relative thereto, a contact carrying lever pivotally mounted intermediate its ends on said cradle, a movable contact carried on each end of said lever, a fixed contact extending from said one side of said base opposite each of said movable contacts for engagement therewith, said movable contact at one end of said lever and its adjacent fixed contact forming a first set of contacts, said movable contact at the other end of said lever and its adjacent fixed contact forming a second set of contacts, magnetic means mounted on said one side of said base and resiliently held in mounted position by said cradle, armature means secured to said lever for coaction with said magnetic means, actuating means for pivotally moving said lever relative to said base between a first position at which said first set of contacts are in engagement and said second set of contacts are disengaged and a second position at which said second set of contacts are in engagement and said first set of contacts are disengaged, and adjusting means including an adjusting screw accessible from the other side of the base for vertically moving said cradle relative to said base to vary the distance said lever must be pivotally moved to travel between said first position and said second position.

References Cited in the file of this patent

UNITED STATES PATENTS

| Number | Name | Date |
|---|---|---|
| Re. 16,940 | Massa | Apr. 24, 1928 |
| 1,097,400 | Dixon | May 19, 1914 |
| 1,989,277 | Jeffrey | Jan. 29, 1935 |
| 2,192,633 | Beam | Mar. 5, 1940 |
| 2,229,022 | Shaw | Jan. 14, 1941 |
| 2,269,863 | Shaw | Jan. 13, 1942 |
| 2,410,055 | Frerer | Oct. 29, 1946 |
| 2,448,772 | Clare et al. | Sept. 7, 1948 |
| 2,460,837 | Malone | Feb. 8, 1949 |
| 2,582,834 | Kautz | Jan. 15, 1952 |